United States Patent
Klockar et al.

(10) Patent No.: US 10,327,212 B2
(45) Date of Patent: Jun. 18, 2019

(54) UPLINK POWER CONTROL IN HETEROGENEOUS NETWORKS

(71) Applicant: TELEFONAKTIEBOLAGET LM ERICSSON (PUBL), Stockholm (SE)

(72) Inventors: Lars Klockar, Rättvik (SE); David Sandberg, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 111 days.

(21) Appl. No.: 15/308,384

(22) PCT Filed: May 6, 2014

(86) PCT No.: PCT/EP2014/059264
§ 371 (c)(1),
(2) Date: Nov. 2, 2016

(87) PCT Pub. No.: WO2015/169346
PCT Pub. Date: Nov. 12, 2015

(65) Prior Publication Data
US 2017/0055229 A1    Feb. 23, 2017

(51) Int. Cl.
*H04W 52/14* (2009.01)
*H04W 52/24* (2009.01)
(Continued)

(52) U.S. Cl.
CPC ....... *H04W 52/244* (2013.01); *H04W 52/146* (2013.01); *H04W 52/241* (2013.01); *H04W 52/267* (2013.01); *H04W 52/325* (2013.01)

(58) Field of Classification Search
CPC ............. H04W 52/244; H04W 52/146; H04W 52/241
(Continued)

(56) References Cited

U.S. PATENT DOCUMENTS 9,918,282 B1*   3/2018  Vivanco ............... H04W 52/243
2010/0029212 A1*  2/2010  Malladi ................. H04W 52/08
                                                                455/63.1
(Continued)

FOREIGN PATENT DOCUMENTS

WO    2010121635 A1   10/2010
WO    2011055555 A1    5/2011

OTHER PUBLICATIONS

3GPP TR 36.921 V11.0.0 3rd Generation Partnership Project; Technical Specification Group Radio Access Network; Evolved Universal Terrestrial Radio Access (E-UTRA); FDD Home eNode B (HeNB) Radio Frequency (RF) requirements analysis (Release 11), Sep. 2012.
(Continued)

*Primary Examiner* — Peter G Solinsky

(57) ABSTRACT

Methods and apparatus for uplink power control in a communication system with a low power cell neighboring a macro cell. The low power cell includes a low power node serving a user equipment (UE). The macro cell includes a base station serving one or more other UE(s). The low power node is configured to determine a power offset between the macro cell and the low power cell. The received power spectral density target for the UE calculation is based on the minimum of a first signal strength target for the UE and estimated noise and interference power(s), or a second signal strength target for the UE and the calculated power offset. The uplink power control for the UE is adjusted based on the calculated received power spectral density target. The first signal strength target may be based on the signal-to-interference-plus-noise ratio target for the UE and the second signal strength target may be based on a signal strength derived from a signal-to-noise ratio target for the UE.

23 Claims, 9 Drawing Sheets

(51) Int. Cl.
*H04W 52/26* (2009.01)
*H04W 52/32* (2009.01)

(58) Field of Classification Search
USPC .......................................................... 370/329
See application file for complete search history.

(56) References Cited

U.S. PATENT DOCUMENTS

| | | | |
|---|---|---|---|
| 2012/0028673 A1 | 2/2012 | Jeong | |
| 2012/0142334 A1 | 6/2012 | Sato et al. | |
| 2012/0224558 A1* | 9/2012 | Jeong | H04W 72/04 370/330 |
| 2012/0314600 A1* | 12/2012 | Zeira | H04W 52/16 370/252 |
| 2013/0040675 A1* | 2/2013 | Ant | H04W 52/226 455/509 |
| 2013/0188501 A1* | 7/2013 | Yang | H04W 28/16 370/252 |
| 2014/0004796 A1* | 1/2014 | Cakulev | H04W 76/14 455/41.2 |
| 2014/0056246 A1* | 2/2014 | Chun | H04W 52/0216 370/329 |
| 2014/0126403 A1* | 5/2014 | Siomina | H04W 24/10 370/252 |
| 2014/0206330 A1* | 7/2014 | Chen | H04W 24/10 455/418 |
| 2014/0213315 A1* | 7/2014 | Kim | H04W 52/325 455/522 |
| 2015/0097433 A1* | 4/2015 | Shichino | H02J 1/14 307/32 |
| 2015/0223253 A1* | 8/2015 | Nakayama | H04W 16/04 370/329 |
| 2015/0319710 A1* | 11/2015 | Rao | H04W 52/244 370/329 |
| 2015/0382375 A1* | 12/2015 | Bhushan | H04L 5/0005 370/252 |
| 2017/0033903 A1* | 2/2017 | Xu | H04W 52/146 |
| 2017/0055227 A1* | 2/2017 | Wu | H04W 52/24 |

OTHER PUBLICATIONS

3GPP TS 36.213 V8.8.0 3rd Generation Partnership Project; Technical Specification Group Radio Access Network; Evolved Universal Terrestrial Radio Access (E-UTRA); Physical layer procedures (Release 8), Sep. 2009.

* cited by examiner

A1. Determining the power offset ($P_{offset}$) between a low power cell (LPC) and one or more macro cell(s)

A2. Calculating a received power spectral density target for a UE in the LPC based on the minimum of:

a) a first signal strength target for the UE and an estimated noise and interference power; or b) a second signal strength target for the UE and the calculated power offset;

A3. adjusting the uplink power control for the UE based on the calculated received PSD target.

Fig. 4b

UPLINK POWER CONTROL IN HETEROGENEOUS NETWORKS

This application is a 371 of International Application No. PCT/EP2014/059264, filed May 6, 2014, the disclosure of which is fully incorporated herein by reference.

TECHNICAL FIELD

The present invention relates to methods and apparatus for adjusting the uplink power control for a user equipment (UE) served by a low power cell to minimise interference caused by, among other things, other UEs in neighbouring macro cells and vice versa.

BACKGROUND

In future wireless communication networks or systems there will be a mixture of multiple types of access nodes or elements with large coverage cells (Macro cells) and small coverage cells (micro/pico/femto cells), with whole or partly overlapping coverage areas. For example, a communication network or system such as a Wide Area Network may use macrocells, picocells, and/or femtocells in order to offer wireless coverage in an environment with a wide variety of wireless coverage areas, ranging from an open outdoor environment to office buildings, homes, and underground areas. Such communication networks or systems may include handoff capability between the macro and small coverage areas. This type of communication network deployment is the so-called Heterogeneous Network deployment (HetNet), which has the capability of handling the large traffic growth predicted in future wireless communication networks and may also extend network coverage to areas with no macro coverage.

Other examples of communication networks or systems that may be used or combined to form a communication network or system such as a HetNet may include, but are not limited to, any communication network or system employing large or macro cells and small or low power cells for serving UEs, or one or more networks or systems having large and/or small cells such as packet or circuit switched network(s), IP based networks, legacy PS networks such as the second generation (2G) or 2.5 generation (2.5G) (e.g. Global System for Mobile Communications (GSM), cdma2000, Wideband Code Division Multiple Access (W-CDMA), third generation (3G) (e.g. Universal Mobile Telephone System (UMTS)), and fourth generation and beyond (4G and beyond) type networks (e.g. networks based on Long Term Evolution (LTE) and LTE-Advanced systems), and/or evolved packet switched (EPS) networks, and/or all internet protocol (IP) based PS networks, Internet Protocol Multimedia Subsystem (IMS) core networks, IMS service networks, microcell/picocell/femtocell networks, IEEE standard 802.11 or Wi-Fi networks for use in offloading traffic from radio access networks (RAN) or mobile networks and the like.

The UE may comprise or represent any device used for communications over a communication network. Examples of a UE that may be used in certain embodiments of the described communication networks are, but are not limited to, wireless devices such as mobile phones, mobile devices, terminals, smart phones, portable computing devices such as lap tops, handheld devices, tablets, netbooks, computers, personal digital assistants and other wireless communication devices. Typically, the output power from the access nodes of small cells (e.g. low power node) is several times smaller compared to the output power of the access nodes of macro cells (e.g. base stations). This difference can create an imbalance between the uplink and downlink of the access nodes of small cells. A communications network (e.g. HetNets) that has a large difference in output power amongst its cells will have different optimum cell borders for the uplink and downlink channels for each access node serving each cell. Conventional uplink power control may be used as described in Third Generation Partnership Project Technical Specification 36.213, section 5, in an attempt to combat the differences in output power amongst the UEs in each cell of the communication network. However, typically such uplink power control is only useful in a homogenous communication network, where each cell does not sufficiently interfere with other cells. In a communication networks having macro cells and small low power cells, (e.g. a HetNet) it is difficult to optimise the network performance in both macro cells and small low power cells using traditional uplink power control methods.

FIGS. 1 and 2 are schematic illustrations of an example communication network or system 100 that includes a small cell 102 with a low power access node 104 (e.g. a low power node) serving a user equipment (UE) 106. The communication network 100 also includes a macro cell 108 with an access node 110 (e.g. a base station) serving another UE 112.

FIG. 1 illustrates the macro cell 108 and small cell 102 defining a path loss (PL) border and a Reference Signal Received Power (RSRP) border. The RSRP border for the small cell 102 is located where a UE 106 in the small cell 102 experiences the same received power for downlink signals from the access node 110 of the macro cell 108 and downlink signals from the access node 104 of the small cell 102. The PL border for the small cell 102 is located where the UE experiences the same path loss for the downlink signals of the macro cell 108 and small cell 102. As can be seen, even though the PL boarder for the cell edge of the small cell 102 is larger, the RSRP border results in a smaller coverage area for the small cell 102. This cross over may determine the small cell 102 uptake area, i.e. the area when macro cell UEs 112 move into the coverage of the small cell 102, and vice-versa for small cell UEs 106.

As illustrated in FIG. 2, a macro user using UE 112 close to or on the cell edge of the small cell 102 may cause interference with UE 106 in the small cell 102. The UE 112 has a lower path loss to the small cell 102, which means the UE 112 of the macro user can cause a lot of interference to the small cell 102 and also to each UE 106 within the small cell 102. In this example, with only one macro cell UE 112, the signal-to-interference-plus-noise ratio experienced by UE 106 ($SINR_{UE1}$) may be expressed as $SINR_{UE1} = P_1 G_{11}/(P_2 G_{21} N_0)$, where $P_1$ is the uplink transmit power of UE 106 of the small cell 102, $G_{11}$ is the uplink path loss from UE 106 of the small cell 102 to the access node 104 of the small cell 102, $P_2$ is the uplink transmit power of UE 112 of the macro cell 108, $G_{21}$ is the uplink path loss from UE 112 of the macro cell 108 to the access node 104 of the small cell 102, and $N_0$ is the noise such as additive white Gaussian noise experienced by UE 106. It is clear that a macro cell UE 112 on the edge of the macro cell 108 will experience a lower uplink path loss, $G_{21}$, to the access node 104 of the small cell 102 compared with the uplink path loss, $G_{22}$, to the access node 110 of the macro cell 108. This means that the macro cell UE 112 will cause a lot of interference to the small cell UE 106. One way to combat the increase in uplink interference is to increase the received/transmitted signal strength, e.g. received/transmitted signal strength target (P0) or the uplink power control target, on the uplink used by each UE 106 in the small cell 102 by a power offset ($P_{offset}$). Another possibility is to use SINR based closed loop uplink power control in the small cell 102. For simplicity and by way of example, P0 is used to represent the received signal strength target for the uplink signal associated with UE 106 received by node 104 of small cell 102. It is to be appreciated, that P0 could alternatively be an transmit signal strength target for the uplink signal associated with UE 106 transmitted by UE 106 to node 104 of small cell 102.

FIG. 3 is an illustration of four scenarios 301, 302, 303 and 304 showing how the performance for a UE 106 in the small cell 102 (e.g. a pico cell) changes with different uplink power control settings in relation to a received signal strength target (P0) at the access node 104 of the small cell 102. Each scenario represents a graph of the user throughput (e.g. User Thput) in Megabits per second (Mbps) vs time in seconds. In each graph, the throughput performance of the small cell UE 106 (e.g. pico cell user) is illustrated with a line and circles and the throughput performance of the macro cell UE 112 (e.g. macro cell user) is illustrated with a line and squares.

Initially, the small cell UE 104 transmits for 5 seconds, after which the macro cell UE 112 beings to transmit and both the small cell UE 104 and macro cell UE 112 transmit for a further 18 seconds.

In scenario 301, the received signal strength power target (P0) for the small cell UE 104 and the macro cell UE 112 that is received at the access node 104 of the small cell 102 are set at −103 dBm. Initially, the small cell UE 106 has excellent throughput performance of around 40 Mbps, however, once the macro cell UE 112 begins transmitting the throughput performance of the small cell UE 106 drops significantly to around 1 Mbps, while the macro cell UE 112 enjoys a throughput performance of around 35-38 Mbps.

In scenario 302, the received signal strength power target (P0) for the small cell UE 104 is set to −100 dBm and that of the macro cell UE 112 is set to −103. Initially, the small cell UE 106 has excellent throughput performance of around 40 Mbps, however, once the macro cell UE 112 begins transmitting the throughput performance of the small cell UE 106 still drops significantly to around 2-3 Mbps, while this is an improvement, it is evident that the macro cell UE 112 degrades further to around 31-33 Mbps.

In scenario 303, the received signal strength power target (P0) for the small cell UE 104 is set to −97 dBm and that of the macro cell UE 112 is set to −103. Initially, the small cell UE 106 has excellent throughput performance of around 40 Mbps, however, once the macro cell UE 112 begins transmitting the throughput performance of the small cell UE 106 still drops significantly to around 5 Mbps, while this is an improvement, it is evident that the macro cell UE 112 degrades further to around 30 Mbps.

In scenario 304, the received signal strength power target (P0) for the small cell UE 104 is set to −87 dBm and that of the macro cell UE 112 is set to −103. Initially, the small cell UE 106 has excellent throughput performance of around 40 Mbps, however, once the macro cell UE 112 begins transmitting the throughput performance of the small cell UE 106 still drops to around 15-17 Mbps, while this is an improvement, it is evident that the macro cell UE 112 significantly degrades further to around 11-12 Mbps.

As in scenario's 303 and 304, setting the high target of P0 to greater than −97 dBm maximizes the throughput performance of the small cell UE 106, but, at the same time, the macro UE 112 throughput performance can significantly degrade when the small cell received signal strength target (or uplink power control target) (P0) is increased. For macro UEs 112, the small cell 102 should use a low received signal strength target (e.g. a low P0 target).

As can be seen, simply increasing the received signal strength target (P0) for small cell UEs 106 in the small cell 102 can have a dramatic impact on the macro cell UEs 112 and vice versa. There is a need for a method to carefully tune the uplink power control so that small cell 102 performance is improved while at the same time minimising the impact or even maintaining performance and coverage for UEs 112 in the macro cell 108.

SUMMARY

It is an object of the present invention to provide methods and apparatus of providing an uplink power control scheme that can be used in a communication system, e.g. such as a Heterogeneous Network (HetNet) deployment, to control the uplink interference in both macro cells and small low power cells. It is proposed herein that the uplink power control scheme in the small cells uses an SINR based uplink power control that is controlled by the difference in downlink output power between a macro cell and a small low power cell. This allows a UE served by the small low power cell to increase the output power when it is under strong interference from UEs served by the macro cell and at the same time the UE served by the small low power cell is controlled such that it does not cause too high an interference level to the macro cells surrounding/neighbouring the small low power cell.

According to a first aspect of the present invention there is provided a method for uplink power control in a communication network or system. The communication network or system including a low power cell with a low power node serving a UE and a macro cell with a base station serving one or more other UE(s). The low power cell is a neighbour of the macro cell. The method, performed by the low power node, includes determining a power offset between the macro cell and the low power cell and calculating a received power spectral density target for the UE based on the minimum of: a) a first signal strength target for the UE and an estimated noise and interference power; or b) a second signal strength target for the UE and the calculated power offset. The method further includes adjusting the uplink power control for the UE based on the received power spectral density target.

As an option, the first signal strength target may be based on a signal-to-interference plus noise ratio (SINR) target for the UE. Optionally, the method further includes determining the SINR target for the UE based on the noise and interference power to achieve a sufficient throughput performance for the UE while minimizing any impact on throughput performance for the one or more other UE(s) in the macro cell. As another option, the second signal strength target may be based on the signal strength derived from a signal strength target for the UE. Optionally, the first and second signal strength targets are initially the same.

As an option, the step of adjusting the uplink power control for the UE further includes determining an uplink power control adjustment based on the received power spectral density and transmitting the uplink power control adjustment to the UE. As another option, adjusting the uplink power control for the UE further includes performing closed loop uplink power control for the UE based on the received power spectral density. Alternatively and/or additionally, adjusting the uplink power control for the UE further includes performing uplink power control based on the uplink scheduling grant on a Physical Downlink Control Channel (PDCCH). Optionally, adjusting the uplink power control for the UE further comprises determining an uplink power control target for the UE based on the received power spectral density target, and transmitting the uplink power control target to the UE for reconfiguring the transmit power of the UE. As an option, the uplink power control target for the UE may be transmitted to the UE using Radio Resource Control (RRC) signalling.

As an option, the method may include estimating the estimated noise and interference power by estimating an interference power corresponding to one or more of the other UE(s) in the macro cell. Optionally, determining a power offset further includes calculating the power offset based on the downlink power difference between the macro cell and the low power cell. As an option, determining the power offset further includes receiving at the low power node a downlink transmit power level associated with the macro cell from the base station. In addition, determining the power offset may further include calculating the downlink transmit power difference based on the received macro cell downlink transmit power and the low power node downlink transmit power. Alternatively or additionally, determining the power offset further includes calculating the power offset based on a cell offset parameter. Optionally, the low power cell overlaps with the macro cell.

As an option, the communication system may further include one or more further macro cell(s) with one or more further base station(s), each further base station serving one or more further UE(s), and the lower power cell is a neighbour of each of the further macro cell(s), where calculating the power offset further includes taking into account the further macro cell(s). Optionally, calculating the power offset further includes taking into account the downlink power difference between the neighbouring macro cell(s) and the low power cell. As an option, calculating the power offset further includes calculating the power offset after receiving the downlink output power levels from the neighbouring macro cells.

Optionally, calculating the power offset may be based on at least any one or more of the following: the average downlink output power levels received from the neighbouring macro cells; the maximum downlink output power level received from the neighbouring macro cells; the minimum downlink output power level received from the neighbouring macro cells; and/or the downlink output power level received from the neighbouring macro cell that is closest to the UE. As another option, estimating the interference power further includes estimating an interference power based on the further UE(s).

According to a second aspect of the invention there is provided an apparatus for uplink power control in a communication system. The communication system including a low power cell with a low power node serving a UE and a macro cell with a base station serving one or more other UE(s), where the low power cell is a neighbour of the macro cell. The apparatus includes a processor, a receiver, a transmitter, and a memory, the processor connected to the receiver, the transmitter and the memory. The processor is configured to determine a power offset between the macro cell (108) and the low power cell (102), calculate a power spectral density target for the UE (106) based on the minimum of: a) a first signal strength target for the UE (106), an estimated noise power, and the estimated interference; or b) a second signal strength target for the UE (106) and the calculated power offset; and adjust the uplink power control for the UE (106) based on the received power spectral density target.

As an option, the first signal strength target for the UE is based on a SINR target for the UE. Optionally, the processor is further configured to determine the SINR target for the UE based on the noise and interference power to achieve a sufficient throughput performance for the UE while minimizing any impact on throughput performance for the one or more other UE(s) in the macro cell. As an option, the second signal strength target is based on a signal strength derived from a SNR target for the UE. As a further option, the first and second signal strength targets are initially the same.

Optionally, the processor is further configured to adjust the uplink power control for the UE by determining an uplink power control adjustment based on the received power spectral density. The transmitter may be configured to transmit the uplink power control adjustment to the UE. As an option, the processor, receiver, and transmitter are further configured to adjust the uplink power control for the UE by performing closed loop uplink power control for the UE based on the received power spectral density. Optionally, the processor and transmitter may be configured to adjust the uplink power control based on the uplink scheduling grant on a PDCCH.

As another option, the processor may be further configured to adjust the uplink power control for the UE by determining a power control target for the UE based on the received power spectral density target. The transmitter may be further configured to transmit the power control target to the UE for reconfiguring the transmit power of the UE. Optionally, the transmitter may be configured to transmit the uplink power control target for the UE using RRC signalling.

As an option, the processor is configured to estimate the interference power corresponding to one or more of the other UE(s) in the macro cell. As another option, the processor may be configured to determine the power offset by calculating the power offset based on the downlink power difference between the macro cell and the low power cell. Additionally or alternatively, the receiver may be configured to receive a downlink transmit power level associated with the macro cell from the base station, and the processor may be configured to determine the power offset by calculating the downlink transmit power difference based on the received macro cell downlink transmit power and the low power node downlink transmit power. As an option, the processor may be configured to determine the power offset by further calculating the power offset based on a cell offset parameter. Optionally, the low power cell overlaps with the macro cell.

Optionally, the communication system further includes one or more further macro cell(s) with one or more further base station(s), each further base station serving one or more further UE(s). The lower power cell is a neighbour of each of the further macro cell(s), where the processor is further configured to calculate the power offset taking into account the further macro cell(s). As an option, the processor is further configured to calculate the power offset by taking into account the downlink power difference between the neighbouring macro cell(s) and the low power cell. Additionally the processor may be further configured to calculate the power offset after receiving the downlink output power levels from the neighbouring macro cells.

As an option, the processor may be further configured to calculate the power offset based on either or at least one or more of: the average downlink output power levels received from the neighbouring macro cells; the maximum downlink output power level received from the neighbouring macro cells; the minimum downlink output power level received from the neighbouring macro cells; and/or the downlink output power level received from the neighbouring macro cell that is closest to the UE.

Optionally, the processor may be further configured to estimate the interference power based on the further UE(s). As another option, the apparatus is implemented in the low power node.

Further aspects of the present invention may include a computer program, comprising computer readable code means which, when run from a computer readable medium in the form of a memory in a processor of an apparatus, causes the apparatus to perform the method(s) as described. A computer program product may also be provided comprising said computer readable medium and said computer program, where the computer program is stored on the computer readable medium.

It is evident that the invention provides the advantage of an uplink power control scheme capable of coordinating the used uplink power within neighbouring macro and small low power cells. A further advantage is that the uplink power control scheme removes the need for manual tuning of the uplink power control settings for UEs in the small low power cells. As a result, another advantage is the ability to control the uplink interference level in the communication system further increasing total uplink system capacity and/or throughput. Another advantage is the reduction in battery consumption for UEs in small low power cells as the macro and small low power cells are able to co-exist.

BRIEF DESCRIPTION OF THE DRAWINGS

FIG. 4b is a flow diagram illustrating another example process for uplink power control according to the present invention;

DETAILED DESCRIPTION

In order to at least partially overcome the problems described above, it is proposed herein to improve the performance of a communications network (e.g. an IP communications network) by providing an uplink power control scheme in the small low power cells (e.g. pico or micro cells) that uses an SINR based closed loop for uplink power control. The SINR based close loop is also controlled by the difference in downlink output power between the macro cell and the small cell. The SINR based closed loop lets the UE, in the small cell, to increase the output power when it is under strong interference from macro users and at the same time it is controlled so that UEs in the small cell do not cause too high interference levels to surrounding macro cells.

Figure 4A:
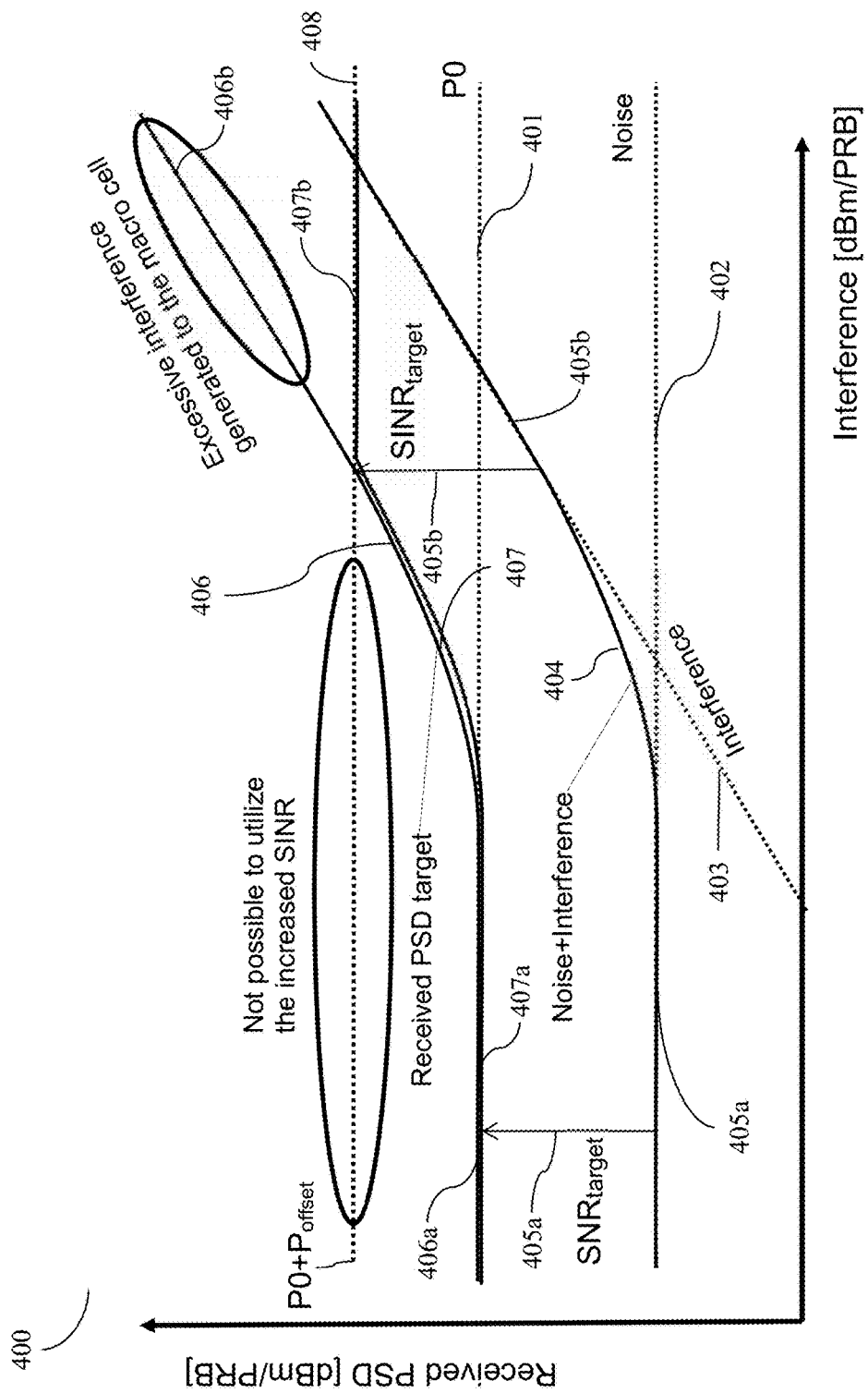
FIG. 4a is a diagram illustrating an example process for uplink power control for UE(s) in a low power cell according to the present invention.

FIG. 4a is a diagram illustrating an example process for an uplink power control scheme for UE(s) in a low power cell. FIG. 4 illustrates a graph of received power spectral density (PSD) vs Interference (dBm/PRB) for a UE in a small low power cell. The received signal strength target, denoted P0, for the uplink signal received from the UE at the node of the low power cell is represented by dashed line 401, the noise level (e.g. AWGN) is represented by dashed line 402. The received signal strength target P0 401 can be set by the node of the small low power cell to ensure the UE maintains a certain throughput, data rate, and/or quality of service, etc. when communicating with the low power cell. The interference level (e.g. from UEs in a neighbouring macro cell or other communication/electronic/industrial interference) is represented by dashed line 403. The noise plus interference level is represented by the solid line 404. For simplicity, the noise level 402 and interference level 403 are represented as being linear, however, it is to be appreciated that the noise level 402 and/or interference level 403 may vary or may be represented as a non-linear function or non-linear lines.

Figure 3:
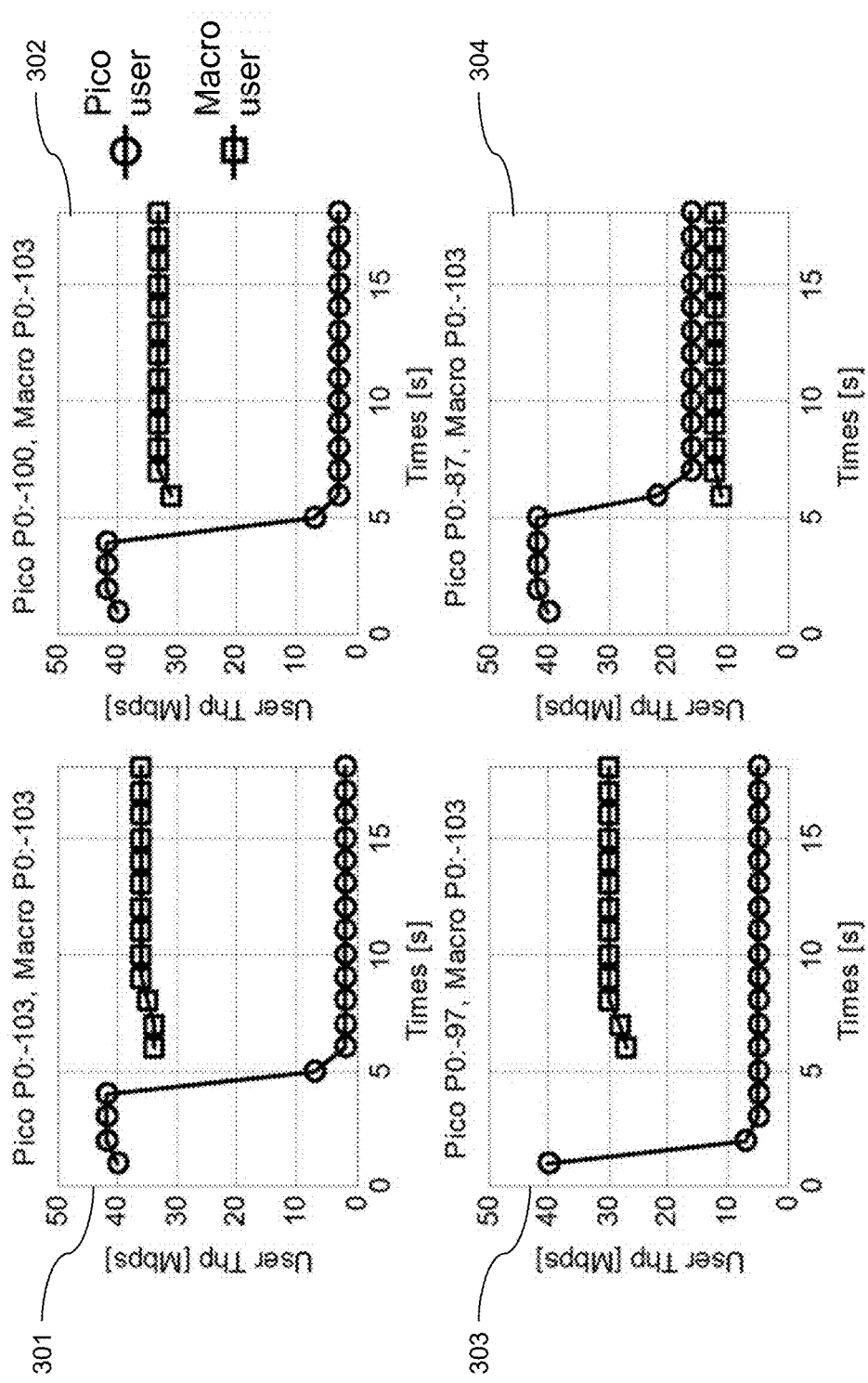
FIG. 3 is a diagram illustrating the various uplink power control scenarios for the communications system of FIGS. 1 and 2.

Initially, the UE is provided with an SNR target 405a above the noise level 402 to meet the received signal strength target P0 401 when there is no interference level 403. The received PSD target is represented by the solid line 406, 406a and 406b. When there is no interference the received PSD target 406a is the same as the received signal strength target P0 401. However, as interference, e.g. from other UEs in a macro cell and/or interference from other electronic/industrial/communication sources etc., increases the noise-plus-interference level 404 begins to increase. In order for the UE to maintain its level of service, the received PSD target takes into account the interference-plus noise and increases to allow the UE to maintain its level of service. The SNR target 405a now becomes an SINR target 405b that is set to be above the noise-plus-interference level. The interference level 403 may continue to increase, e.g. as more and more UEs use the macro cell and/or more UEs use the small cell, and in order for the UE to maintain the same SINR target above the noise-plus-interference level 405, this means the received PSD target 406 also increases. Eventually, if the received PSD target 406 is and the UE's transmission power are allowed to increase unchecked to maintain the UE's level of service, then the UE will generate excessive interference to the UEs in the macro cell and/or other UEs in the small cell (e.g. this is reminiscent of scenarios 303 and 304 in FIG. 3, where excessive interference from the pico cell severely limited the performance of the macro cell). In this example, the point at which the received PSD target causes the UE to generate excessive interference to the macro cell is represented by the received PSD target 406b.

For example, with an SINR based closed loop uplink power control as illustrated by the received PSD target 406, 406a and 406b in FIG. 4 in the small cell the increase in output power for the UE's in the small cell could be even larger compared to the fixed P0 adjustment. If the closed loop power control SINR target 405b is set to 15 dB the increase in output power for the small cell UE when there is a macro user on the cell edge would be 13 dB+15 dB=28 dB. Hence, using only SINR based power control may solve the problem of excess interference when the interference level 403 is low but can instead cause excessive interference, to e.g. a macro cell, when the interference is high as illustrated by the received PSD target 406*b*. This can also lead to an increased drain of batteries in the UEs as they try and combat increasing interference level 403 with an increasing level of transmit power in the uplink.

The uplink power control scheme described herein solves this problem of excessive interference when the received noise-plus-interference level 404 is high by introducing an upper limit for the received PSD target 406. The upper limit for the received PSD target 406 is illustrated by the solid line 407, 407*a* and 407*b*. For low to medium interference levels this line 407 and 407*a* is similar to or identical to the SINR based power control or received PSD target 406 and 406*a*, but when the noise-plus-interference level 404 reaches a certain level the SINR based power control will require a received PSD target 407 that is considered to generate too much interference to neighbor (e.g. macro) cells. Above this point, the uplink power control scheme limits the received PSD target 407 to P0+$P_{offset}$ in order to maintain a reasonable SINR in neighbor (macro) cells. The P0+$P_{offset}$ level is illustrated as the dotted line 408.

In other words, the uplink power control scheme calculates the uplink power control target (or the received PSD target, denoted $PSD_{rx,target}$) for each UE in the low power cell using $PSD_{rx,target}=\min(SINR_{target}+[N+I], P0+P_{offset})$, where $SINR_{target}$ is a first signal strength target called the signal-to-interference plus noise ratio target sent to the UE for performing SINR closed loop power control, [N+I] is the estimated noise and interference from other sources such as other UEs in neighbouring macro cells and/or other industrial/electronic/communication interference. When there is no or negligible interference, then the first signal strength target ($SINR_{target}$) for a UE may be set to an $SNR_{target}$ called the signal-to-noise ratio target. P0 is a second signal strength target (e.g. a power control target) sent to the UE (e.g. through RRC signaling or other side channel signaling), and $P_{offset}$ is a power offset for the low power cell used to limit the $PSD_{rx,target}$. For an SINR based UL power control scheme, P0 may be set so that the $SINR_{target}$ is reached at the cell edge in a low load scenario.

To steer the UE transmit power to get the received PSD as close to the received PSD target as possible, the conventional 3GPP closed loop power control may be used. For example, this may be performed by transmitting a UE specific power adjustment included in the uplink scheduling grant on PDCCH and is updated fast enough to follow slow fading. Alternatively, changes to P0 may be signaled to the UE, which may require RRC signaling.

The $P_{offset}$ in the small cell may be set based on the difference in downlink transmit/output power ($P_{dlPowerDifference}$) between the small cell and one or more neighboring cells (e.g. macro cells), e.g. $P_{offset}=P_{dlPowerDifference}$. For example, in an LTE based network the downlink transmit/output powers may be received by the small cell over the X2 interface. The macro cell(s) having a neighbor relation to the small cell may be configured to send their downlink output power level to the small cell. This could be performed the first time the relation between the macro cells and small cell is determined and registered or added or at a change of downlink output power levels within the macro cell(s). The power control compensation factor ($P_{offset}$) is then set by the difference in downlink output power ($P_{dlPowerDifference}$) between the macro cell and the small cell. Other parameters or offsets may also be taken into account when calculating $P_{offset}$. For example, if a cell offset (CO) or cell selection offset (CSO) is used to extend the coverage of the small cell, this factor could also be taken into account when calculating $P_{offset}$, for example, $P_{offset}=P_{dlPowerDifference}-CSO[dB]$ or $P_{offset}=P_{dlPowerDifference}-CO[dB]$. Other parameters that are used to extend or adjust the coverage of the small cell may also be used in calculating $P_{offset}$.

For example, with the uplink power control scheme based on SINR based power control for UEs in the small cell and limiting the increase in received PSD target to P0+$P_{offset}$, each UE will increase their output power when there are one or more UEs of macro users that are causing large uplink interference towards the small cell 102. The benefit with this solution when compared to fixed adjustment of the uplink power control target using only SINR closed loop power control, which can lead to excessive interference to the macro cell, is that the UEs in the small cell will only use higher output power when needed. This will create less interference towards neighbor cells and save battery in the UE when there is no heavy uplink interference from macro users.

Figure 1:
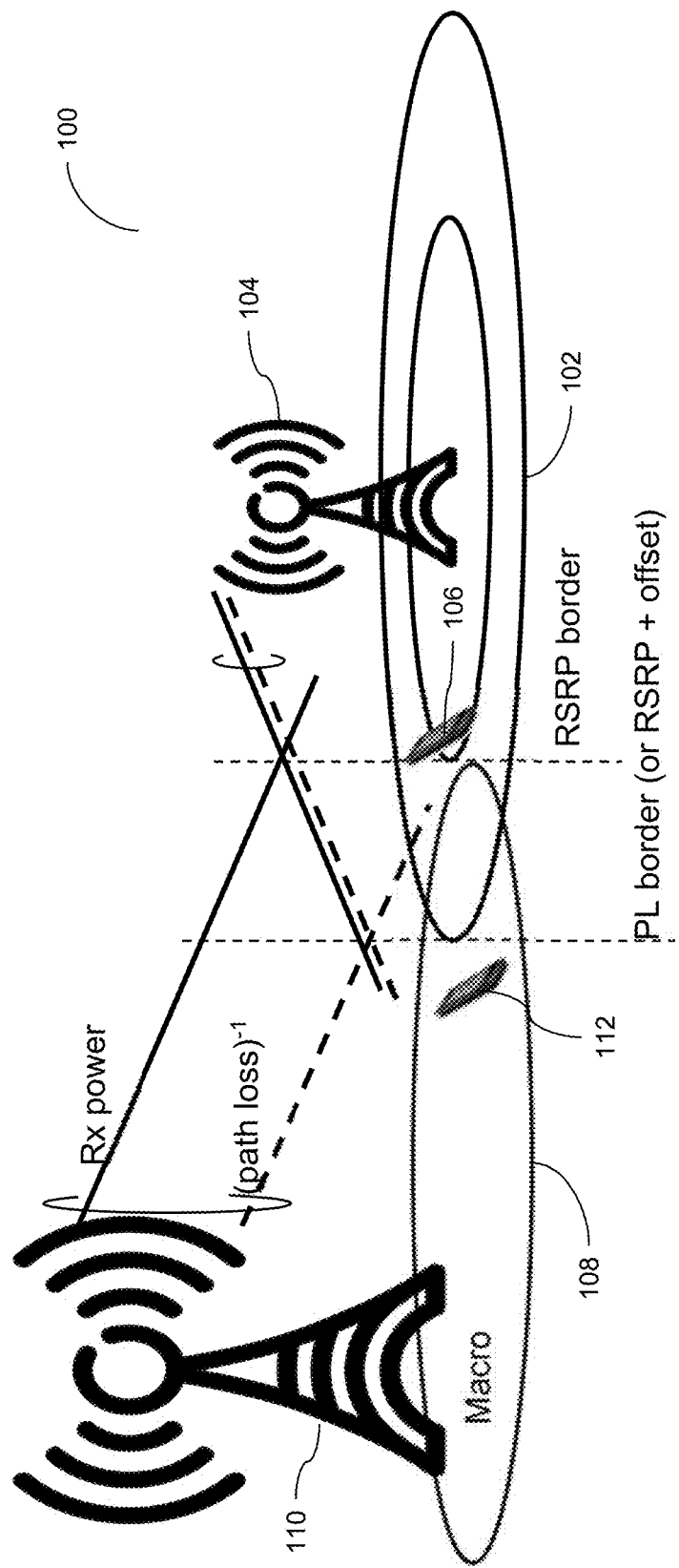
FIG. 1 is a schematic diagram illustrating a communications system with a low power cell neighbouring a macro cell.
Figure 2:
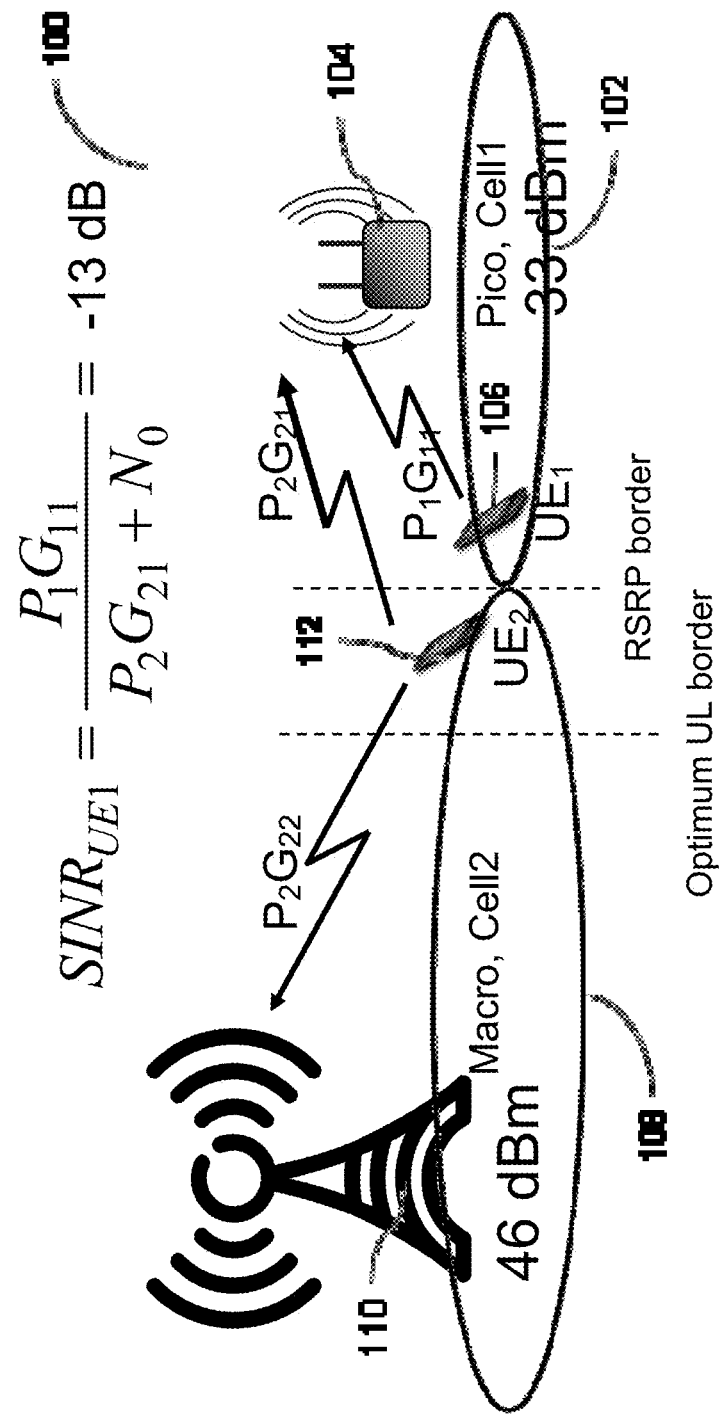
FIG. 2 is a is a schematic diagram illustrating the communications system of FIG. 1 illustrating interference between user equipment of the low power cell and macro cell.

FIG. 4*b* is a flow diagram illustrating another example process for uplink power control in a communication system 100. For simplicity we will refer to the references used in FIGS. 1 and 2. The communication system 100 includes a low power cell 102 with a low power node 104 serving at least one UE 106. The communication system 100 also includes a macro cell 108 with a base station 110 serving one or more other UE(s) 112. The low power cell 102 is a neighbour of the macro cell 108. The uplink power control scheme, performed by the low power node 104, may include the following steps:

A1. Determining a power offset, ($P_{offset}$), between the low power cell 102 and the macro cell 108.

A2. Calculating a received power spectral density target for UE 106 based on the minimum of:
  a) a first signal strength target for the UE 106 and an estimated noise and interference power; or
  b) a second signal strength target for the UE 106 and the calculated power offset;

A3. Adjusting the uplink power control for the UE based on the received power spectral density target.

Figure 4C:
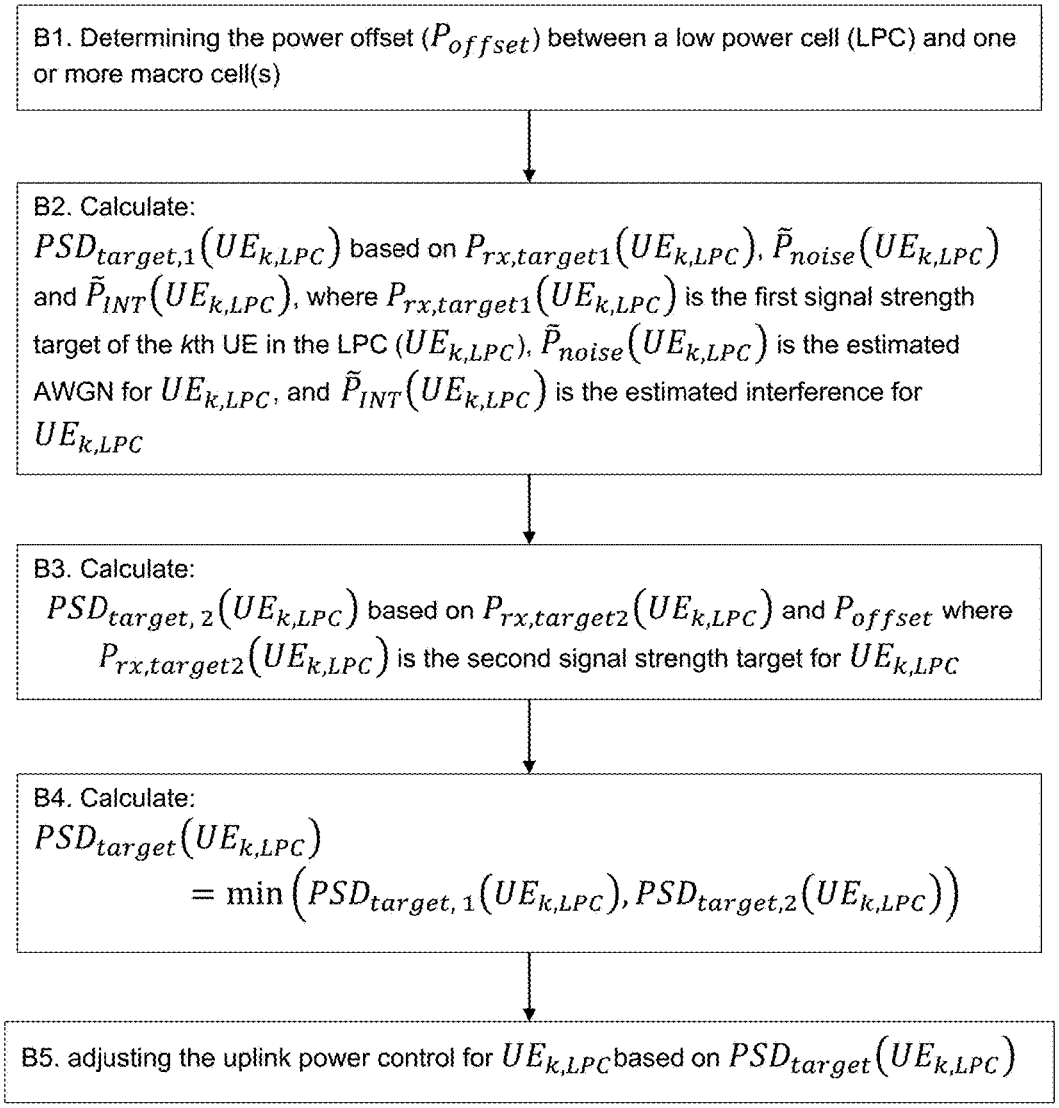
FIG. 4c is another flow diagram illustrating yet another example process for uplink power control according to the present invention.

FIG. 4*c* is another flow diagram illustrating an example process for uplink power control in the communication system 100. For simplicity, the reference numerals of FIGS. 1-2 have been reused for the same or similar components by way of example only. The communication system 100 includes a low power cell 102 with a low power node 104, where the low power node 104 serves 0<k≤UEs. The communication system 100 also includes one or more macro cell(s) 108 with a base station 110 serving one or more other UE(s) 112. The low power cell 102 is a neighbour of at least one of the macro cell(s) 108. The uplink power control scheme, performed by the low power node 104 for the kth UE 106 of the low power cell 102 denoted $UE_{k,LPC}$, may include the following steps:

B1. Determining a power offset, ($P_{offset}$), between the low power cell 102 and the macro cell 108.

B2. Calculate a first power spectral density target for the kth UE 106 in the low power cell 102 ($PSD_{target,1}(UE_{k,LPC})$) based on $P_{rx,target1}(UE_{k,LPC})$, $\tilde{P}_{noise}(UE_{k,LPC})$ and $\tilde{P}_{INT}(UE_{k,LPC})$, where ($PSD_{rx,target,1}(UE_{k,LPC})$) is the first signal strength target for $UE_{k,LPC}$, $\tilde{P}_{noise}(UE_{k,LPC})$ is the estimated AWGN for $UE_{k,LPC}$, and $\tilde{P}_{INT}(UE_{k,LPC})$ is the estimated interference for $UE_{k,LPC}$.

B3. Calculate a second power spectral density target for the kth UE 106 in the low power cell ($PSD_{target,2}(UE_{k,LPC})$) based on $P_{rx,target2}(UE_{k,LPC})$ and $P_{offset}$, where $P_{rx,target2}(UE_{k,LPC})$ is the second signal strength target for $UE_{k,LPC}$ B4. Calculate the received power spectral density target ($PSD_{target}(UE_{k,LPC})$) based on: $PSD_{target}(UE_{k,LPC})$=min ($PSD_{target,1}(UE_{k,LPC})$, $PSD_{target,2}(UE_{k,LPC})$)

B5. adjusting the uplink power control for $UE_{k,LPC}$ based on $PSD_{target}(UE_{k,LPC})$.

In step B2, the first signal strength target, $P_{rx,target1}(UE_{k,LPC})$, may be based on an SINR target for $UE_{k,LPC}$ 106 denoted $P_{SINR,target}(UE_{k,LPC})$. The process may also include a step for determining the SINR target for $UE_{k,LPC}$ 106 based on the noise and interference power (e.g. $\tilde{P}_{noise}(UE_{k,LPC})$ and $\tilde{P}_{INT}(UE_{k,LPC})$) to achieve a sufficient throughput performance for $UE_{k,LPC}$ 106 while minimizing any impact on throughput performance for the one or more other UE(s) 112 in the macro cell that neighbours the low power cell 102. When there is no or negligible interference, then, $P_{rx,target1}(UE_{k,LPC})$ may be set as an SNR target for $UE_{k,LPC}$ 106.

For example, $P_{rx,target1}(UE_{k,LPC})=P_{SINR,target}(UE_{k,LPC})$ and $PSD_{target,1}(UE_{k,LPC})=P_{rx,target1}(UE_{k,LPC})+\tilde{P}_{noise}(UE_{k,LPC})+\tilde{P}_{INT}(UE_{k,LPC})$.

In step B3, the second signal strength target, $P_{rx,target2}(UE_{k,LPC})$, may be based on the signal strength derived from a signal strength target for the UE 106. For example, $P_{rx,target2}(UE_{k,LPC})$ may be the received signal strength target (P0) for $UE_{k,LPC}$ 106 denoted $P0(UE_{k,LPC})$. For example, $P_{rx,target2}(UE_{k,LPC})=P0(UE_{k,LPC})$ and $PSD_{target,2}(UE_{k,LPC})=P_{rx,target2}(UE_{k,LPC})+P_{offset}$. The first and second signal strength targets may initially be set to be the same e.g. when $\tilde{P}_{INT}(UE_{k,LPC})$ is negligible, and then these targets may be based on an SNR target.

In step B5, adjusting the uplink power control for $UE_{k,LPC}$ 106 may further include the steps of determining an uplink power control adjustment based on $PSD_{target}(UE_{k,LPC})$ and transmitting the uplink power control adjustment to for $UE_{k,LPC}$ 106. In addition, adjusting the uplink power control for $UE_{k,LPC}$ 106 may further include performing closed loop uplink power control for $UE_{k,LPC}$ 106 based on the $PSD_{target}(UE_{k,LPC})$. For example, the closed loop uplink power control may be an SINR based closed loop uplink power control. Alternatively or additionally, adjusting the uplink power control for $UE_{k,LPC}$ 106 may further include performing uplink power control based on the uplink scheduling grant on a PDCCH or similar control channel used for uplink power control.

In step B5, adjusting the uplink power control for $UE_{k,LPC}$ 106 may further include determining an uplink power control target for $UE_{k,LPC}$ 106 based on the $PSD_{target}(UE_{k,LPC})$, and transmitting the uplink power control target to $UE_{k,LPC}$ 106 for reconfiguring the transmit power of $UE_{k,LPC}$ 106. For example, the uplink power control target for the UE (106) is transmitted to the UE (106) using Radio Resource Control, RRC, signalling or other similar signalling or signalling channel.

The process may further include the step of estimating $\tilde{P}_{INT}(UE_{k,LPC})$ based on one or more of the other UE(s) 112 in the macro cell 108 that may be interfering with $UE_{k,LPC}$ 106. Estimating $\tilde{P}_{INT}(UE_{k,LPC})$ may further include estimating interference from other sources, e.g. other communication networks, that may be interfering with $UE_{k,LPC}$ 106.

In step A1, determining the power offset, ($P_{offset}$), between the low power cell 102 and the macro cell 108 may further include calculating the $P_{offset}$ based on the downlink power difference between the macro cell and the low power cell. For example, determining the $P_{offset}$ may further include receiving at the low power node 102 a downlink transmit power level associated with the macro cell 108 from the base station 110. The downlink transmit power difference may be calculated based on the received macro cell downlink transmit power and the low power node downlink transmit power. Additionally, other parameters may be taken into account when calculating the $P_{offset}$, for example, determining the $P_{offset}$ may further include calculating $P_{offset}$ based on a cell offset or cell selection offset, or other parameter used for calculating $P_{offset}$.

Figure 5A:
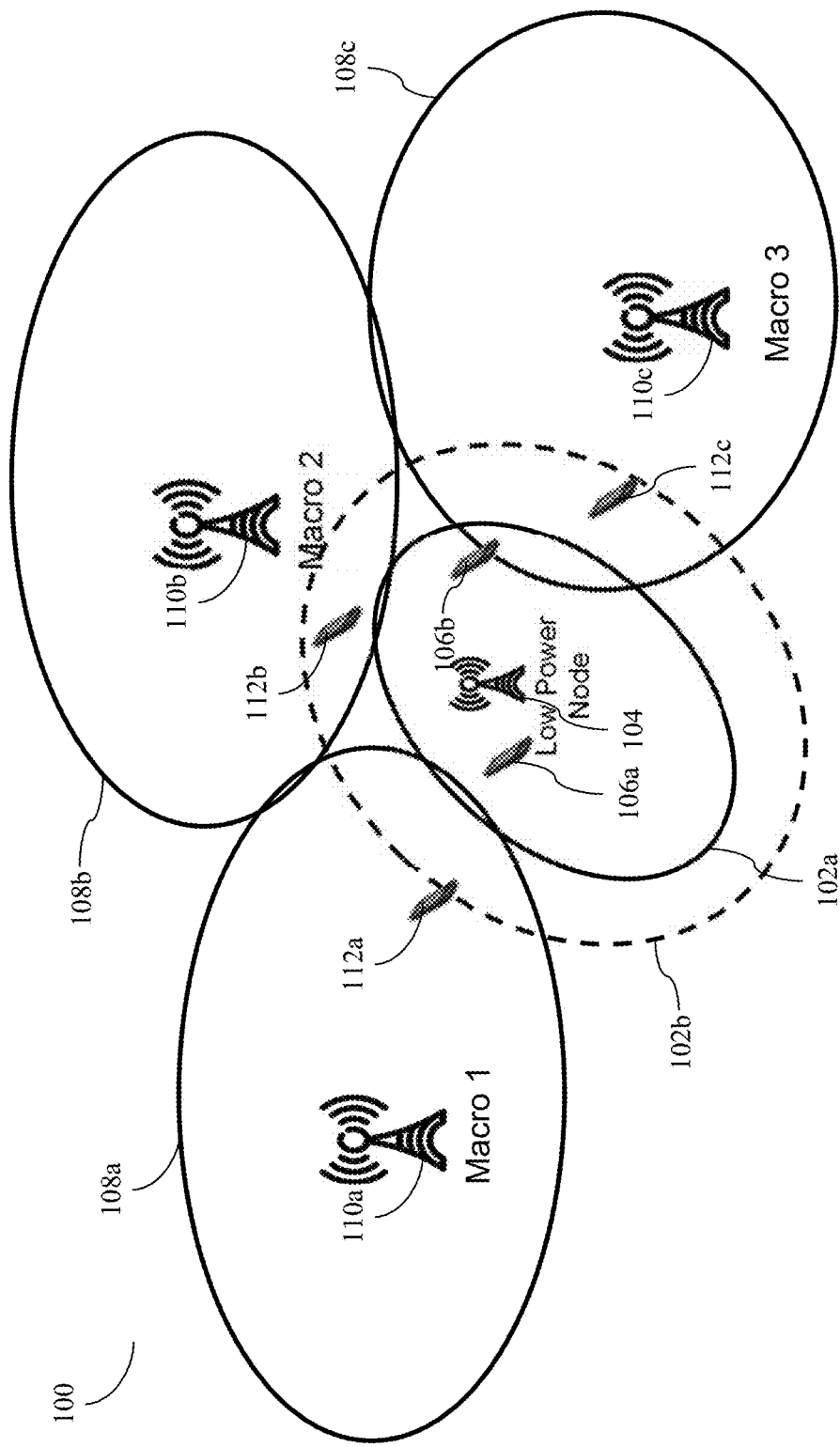
FIG. 5a is a flow diagram illustrating a further example process for uplink power control according to the present invention.
Figure 5B:
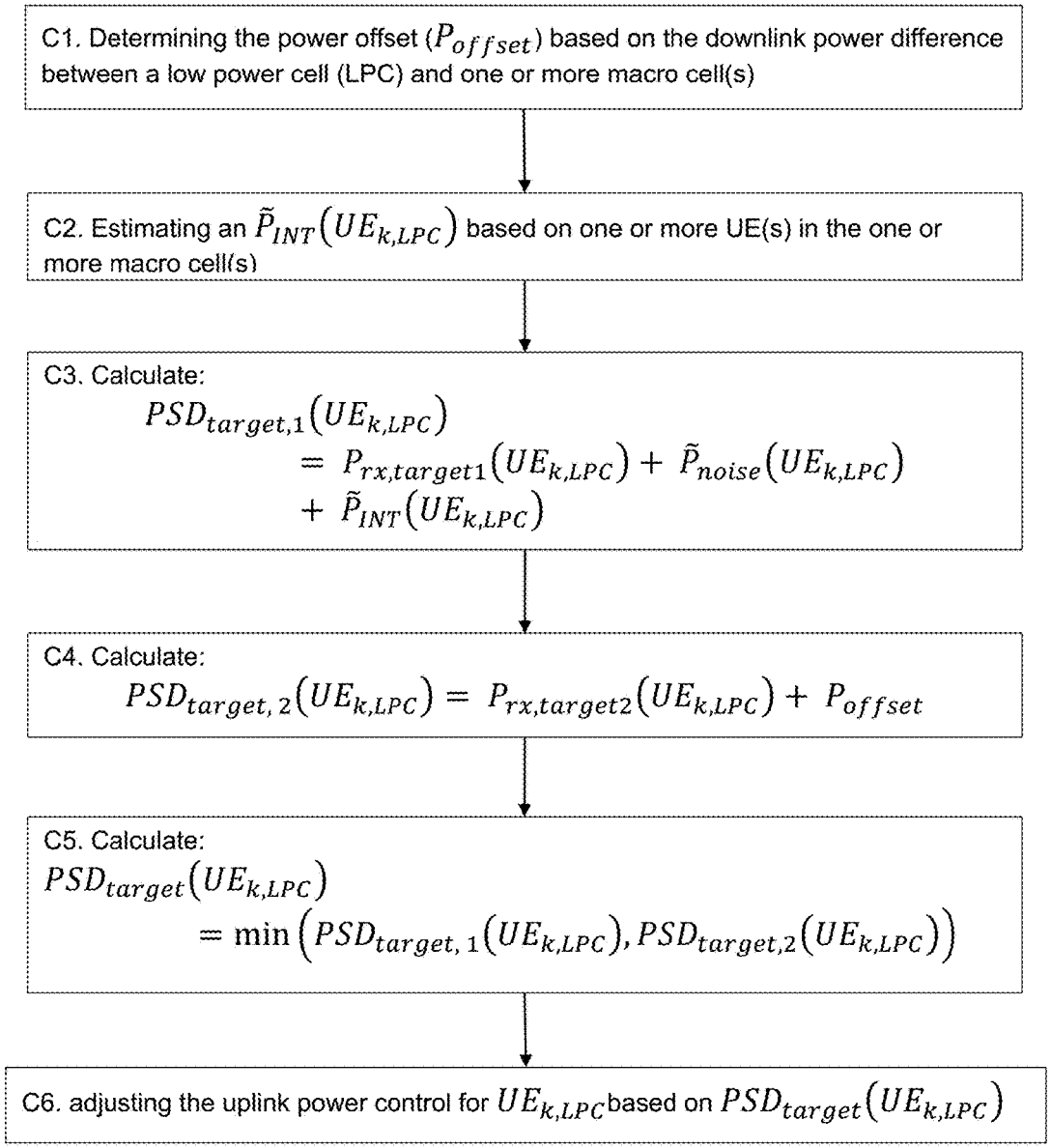
FIG. 5b is a schematic diagram illustrating another example of uplink power control for a low power cell in the communications system of FIGS. 1 and 2 with the low power cell neighbouring multiple macro cells.

FIG. 5a is a schematic illustration of the communication system 100 including a plurality of macro cells 108a-108c and a low power cell 102a and FIG. 5b is another flow diagram illustrating another example process for uplink power control in the communication system 100. For simplicity, the reference numerals of FIGS. 1-2 have been reused for the same or similar components by way of example only. The communication system 100 includes a low power cell 102a with a low power node 104, where the low power node 104 serves 0<k≤UEs, in this case, there are two UEs, a kth UE 106a that is denoted $UE_{k,LPC}$ and another UE 106b. The communication system 100 also includes a plurality of macro cell(s) 108a-108c, in which each of the macro cells 108a-108c includes a base station 110a-110c serving one or more corresponding other UE(s) 112a-112c. The low power cell 102a is a neighbour of macro cell(s) 108a-108c. The coverage of the low power cell 102a may be extended such that the low power cell 102a overlaps with one or more of the macro cells 108a-108c as represented by the dashed line of low power cell 102b. For example, the node 104 of low power cell 102a may use a cell selection offset, cell offset parameter or other type of parameter for extending coverage of the low power cell 102a to that of low power cell 102b.

The process defining the uplink power control scheme may be performed by the low power node 104 for each UE 106a-106b in the low power cell 102a. By way of example only, the process performed by the low power node 104 for the kth UE 106a of the low power cell 102a, may include the following steps:

C1. Determining a power offset, ($P_{offset}$), based on the downlink power difference between the low power cell 102 and one or more of the macro cell(s) 108a-108c.

C2. Estimating an $\tilde{P}_{INT}(UE_{k,LPC})$ based on one or more other UE(s) 112a-112c being served or in the one or more macro cell(s) 108a-108c. This estimation may be based on the one or more other UE(s) 112a-112c that contributes the most interference to $UE_{k,LPC}$ 106a (e.g. UEs 112a and 112b).

C3. Calculate a first power spectral density target for the kth UE 106a, denoted $PSD_{target,1}(UE_{k,LPC})$, in the low power cell 102) based on $P_{rx,target1}(UE_{k,LPC})$, $\tilde{P}_{noise}(UE_{k,LPC})$ and $\tilde{P}_{INT}(UE_{k,LPC})$, where $P_{rx,target,1}(UE_{k,LPC})$) is the first signal strength target for $UE_{k,LPC}$, $\tilde{P}_{noise}(UE_{k,LPC})$ is the estimated AWGN for $UE_{k,LPC}$, and $\tilde{P}_{INT}(UE_{k,LPC})$ is the estimated interference for $UE_{k,LPC}$.

For example,
$PSD_{target,1}(UE_{k,LPC})=P_{rx,target1}(UE_{k,LPC})+\tilde{P}_{noise}(UE_{k,LPC})+\tilde{P}_{INT}(UE_{k,LPC})$.

C4. Calculate a second power spectral density target for the kth UE 106a in the low power cell ($PSD_{target,2}(UE_{k,LPC})$) based on $P_{rx,target2}(UE_{k,LPC})$ and $P_{offset}$, where $P_{rx,target2}(UE_{k,LPC})$ is the second signal strength target for $UE_{k,LPC}$ For example,
$PSD_{target,2}(UE_{k,LPC})=P_{rx,target2}(UE_{k,LPC})+P_{offset}$.

C5. Calculate the received power spectral density target ($PSD_{target}(UE_{k,LPC})$) based on: $PSD_{target}(UE_{k,LPC})$=min ($PSD_{target,1}(UE_{k,LPC})$, $PSD_{target,2}(UE_{k,LPC})$)

C6. adjusting the uplink power control for $UE_{k,LPC}$ based on $PSD_{target}(UE_{k,LPC})$.

In step C1, determining and/or calculating the $P_{offset}$ may include taking into account the further macro cell(s) 108a-108c. This may be performed by taking into account the downlink power difference between the neighbouring macro cell(s) 108a-108c and the low power cell 102.

For example, in step C1, determining the power offset, ($P_{offset}$), between the low power cell 102 and the macro cells 108a-108c may further include calculating the $P_{offset}$ based on the downlink power difference between each macro cell 108a-108c and the low power cell 102. For example, determining the $P_{offset}$ may further include receiving at the low power node 102 a downlink transmit power level associated with each macro cell 108a-108c from the corresponding base stations 110a-110c. The downlink transmit power difference may be calculated based on the received macro cell downlink transmit powers and the low power node downlink transmit power. Additionally, other parameters may be taken into account when calculating the $P_{offset}$, for example, determining the $P_{offset}$ may further include calculating $P_{offset}$ based on a cell offset or cell selection offset, or other parameter used for calculating $P_{offset}$.

There are numerous ways to combine the downlink power difference between each macro cell 109a-108c and the low power cell 102. For example, calculating the $P_{offset}$ may be based on either or at least one of: the average downlink output power levels received from the neighbouring macro cells 108a-108c; the maximum downlink output power level received from the neighbouring macro cells 108a-108c; the minimum downlink output power level received from the neighbouring macro cells 108a-108c; and/or the downlink output power level received from the neighbouring macro cell 108a-108c that is closest to $UE_{k,LPC}$ 106a. The $P_{offset}$ may be calculated after receiving the downlink output power levels from each of the neighbouring macro cells 108a-108c.

In step C2, the process may further include the step of estimating $\tilde{P}_{INT}(UE_{k,LPC})$ based on one or more of the other UE(s) 112a-112c in the macro cells 108a-108c that may be interfering with $UE_{k,LPC}$ 106a. Estimating $\tilde{P}_{INT}(UE_{k,LPC})$ may further include estimating interference from other sources, e.g. other communication networks, industrial sources, other devices in the vicinity of $UE_{k,LPC}$ 106a, that may be interfering with $UE_{k,LPC}$ 106a.

In step C3, the first signal strength target, $P_{rx,target1}(UE_{k,LPC})$, may be based on an SINR target for $UE_{k,LPC}$ 106a denoted $P_{SINR,target}(UE_{k,LPC})$. The process may also include a step for determining the SINR target for $UE_{k,LPC}$ 106 based on the noise and interference power (e.g. $\tilde{P}_{noise}(UE_{k,LPC})$ and $\tilde{P}_{INT}(UE_{k,LPC})$) to achieve a sufficient throughput performance for $UE_{k,LPC}$ 106a while minimizing any impact on throughput performance for the one or more other UE(s) 112 in the macro cell that neighbours the low power cell 102. When there is no or negligible interference, then, $P_{rx,target1}(UE_{k,LPC})$ may be set as an SNR target for $UE_{k,LPC}$ 106a.

For example, $P_{rx,target1}(UE_{k,LPC})=P_{SINR,target}(UE_{k,LPC})$ and $PSD_{target,1}(UE_{k,LPC})=P_{rx,target1}(UE_{k,LPC})+\tilde{P}_{noise}(UE_{k,LPC})+\tilde{P}_{INT}(UE_{k,LPC})$.

In step C4, the second signal strength target, $P_{rx,target2}(UE_{k,LPC})$, may be based on the signal strength derived from a signal strength target for the UE 106a. For example, $P_{rx,target2}(UE_{k,LPC})$ may be the received signal strength target (P0) for $UE_{k,LPC}$ 106a denoted $P0(UE_{k,LPC})$. For example, $P_{rx,target2}(UE_{k,LPC})=P0(UE_{k,LPC})$ and $PSD_{target,2}(UE_{k,LPC})=P_{rx,target2}(UE_{k,LPC})+P_{offset}$. The first and second signal strength targets may initially be set to be the same e.g. when $\tilde{P}_{INT}(UE_{k,LPC})$ is negligible, and then these targets may be based on an SNR target.

In step C6, adjusting the uplink power control for $UE_{k,LPC}$ 106a may further include the steps of determining an uplink power control adjustment based on $PSD_{target}(UE_{k,LPC})$ and transmitting the uplink power control adjustment to for $UE_{k,LPC}$ 106a. In addition, adjusting the uplink power control for $UE_{k,LPC}$ 106a may further include performing closed loop uplink power control for $UE_{k,LPC}$ 106a based on the $PSD_{target}(UE_{k,LPC})$. For example, the closed loop uplink power control may be an SINR based closed loop uplink power control. Alternatively or additionally, adjusting the uplink power control for $UE_{k,LPC}$ 106a may further include performing uplink power control based on the uplink scheduling grant on a PDCCH or similar control channel used for uplink power control.

In step C6, adjusting the uplink power control for $UE_{k,LPC}$ 106a may further include determining an uplink power control target for $UE_{k,LPC}$ 106a based on the $PSD_{target}(UE_{k,LPC})$, and transmitting the uplink power control target to $UE_{k,LPC}$ 106a for reconfiguring the transmit power of $UE_{k,LPC}$ 106. For example, the uplink power control target for the $UE_{k,LPC}$ 106a is transmitted to the $UE_{k,LPC}$ 106a using RRC signalling or other similar signalling or signalling channel.

Figure 6:
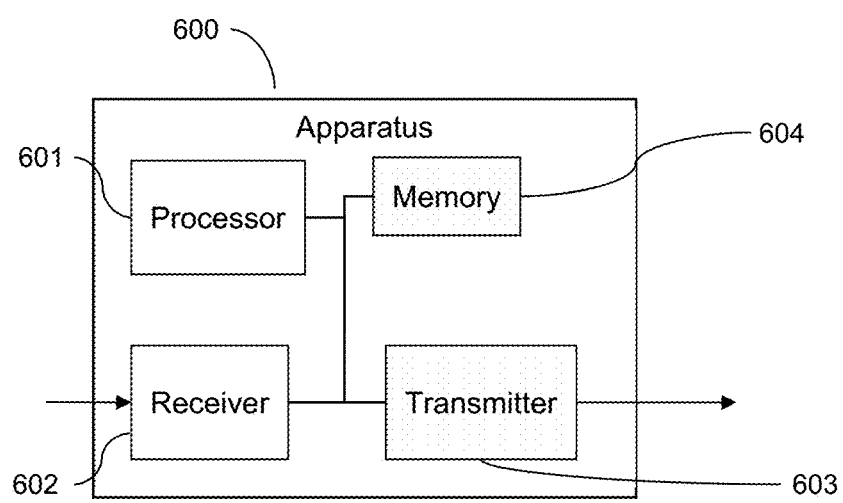
FIG. 6 is a schematic illustration of an example apparatus according to the invention.

FIG. 6 is a schematic illustration of an apparatus 600 for use in uplink power control in a communications network 100 (e.g. a HetNet). For simplicity, the reference numerals of FIGS. 1-5 have been reused for the same or similar components by way of example only. The communication system 100 may include a low power cell 102 with a low power node 104 serving a UE 106 and a macro cell 108 with a base station 110 serving one or more other UE(s) 112. The low power cell 102 is a neighbour of the macro cell 108 and low power cell 102 may overlap with the macro cell 108. The apparatus 600 includes a processor 601, receiver 602, transmitter 603, memory 604, and the processor 601 being coupled to the receiver 602, the transmitter 603, and the memory 604. The memory 604 may be a computer readable medium that may include computer program or instructions stored thereon, which when executed, may configure the processor 601, receiver 602, and transmitter 603 to implement the processes for performing uplink power control as described herein.

In operation, the processor 601 may be is configured to determine a power offset between the macro cell 108 and the low power cell 102. The processor 601 may then be configured to calculate a power spectral density target for the UE 106 based on the minimum of: a) a first signal strength target for the UE 106, an estimated noise power, and the estimated interference; or b) a second signal strength target for the UE 106 and the calculated power offset. The processor 601 and the transmitter 603 may be further configured to adjust the uplink power control for the UE 106 based on the received power spectral density target.

The first signal strength target for the UE 106 may be based on a SI NR target for the UE 106. In which case, the processor may also be further configured to determine the SINR target for the UE 106 based on the noise and interference power to achieve a sufficient throughput performance for the UE 106 while minimizing any impact on throughput performance for the one or more other UE(s) 112 in the macro cell 108.

The second signal strength target may be based on a signal strength derived from a received signal strength target for the UE 106. For example, a SNR target for the UE 106 when there is no interference or low interference condition exists in the low power cell 102. The processor may also be further configured to determine the received signal strength target for the UE 106 based on the noise and to achieve a sufficient throughput performance for the UE 106 in a low interference scenario. Initially, the first and second signal strength targets may be initially set to be the same.

The processor 601 may be further configured to adjust the uplink power control for the UE 106 by determining an uplink power control adjustment based on the received power spectral density. In which case, the transmitter 603 is configured to transmit the uplink power control adjustment to the UE 106. The processor 601, receiver 602, and transmitter 603 may be further configured to adjust the uplink power control for the UE 106 by performing closed loop uplink power control for the UE 106 based on the calculated received power spectral density. For example, the processor 601 and transmitter 603 may be configured to adjust the uplink power control based on the uplink scheduling grant on a PDCCH or any other similar control channel.

Alternatively or additionally, the processor 601 may be further configured to adjust the uplink power control for the UE 106 by determining a power control target (or uplink power control target) for the UE (106) based on the received power spectral density target. The transmitter 603 is further configured to transmit the power control target to the UE 106 for reconfiguring the transmit power of the UE 106. For example, the transmitter 603 may be configured to transmit the uplink power control target for the UE 106 using RRC signalling.

The processor 601 and/or the receiver 602 may be configured to estimate the interference power corresponding to one or more of the other UE(s) 112 in the macro cell 108. Additionally or alternatively, the processor 601 and/or the receiver 602 may be further configured to estimate the interference power based on other interference sources such as other communication networks, industrial interference sources, or interference from other devices in the vicinity of UE 106.

The processor 601 may be configured to determine the power offset by calculating the power offset based on the downlink power difference between the macro cell 108 and the low power cell 102. For example, the receiver 602 may be configured to receive a downlink transmit power level associated with the macro cell 108 from the base station 110. The processor 601 may be configured to determine the power offset by calculating the downlink transmit power difference based on the received macro cell downlink transmit power and the low power node downlink transmit power. Additionally, the processor 601 may be configured to determine the power offset by further calculating the power offset based on a cell offset or cell selection offset or any other parameter or offset parameter.

If the communication system 100 further includes one or more further macro cell(s) 108a-108c with one or more further base station(s) 110a-110b, each further base station serving one or more further UE(s) 112a-112c, and the lower power cell 102 is a neighbour of each of the further macro cell(s) 108a-108c, then the processor 601 may be further configured to calculate the power offset taking into account the further macro cell(s) 108a-108c. For example, the processor 601 may be further configured to calculate the power offset by taking into account the downlink power difference between the neighbouring macro cell(s) 108a-108c and the low power cell 102. The processor may be configured to calculate the power offset after receiving the downlink output power levels from the neighbouring macro cells 108a-108c.

The processor 601 may be further configured to calculate the power offset based on either, or at least one or more of: the average downlink output power levels received from the neighbouring macro cells 108a-108c; the maximum downlink output power level received from the neighbouring macro cells 108a-108c; the minimum downlink output power level received from the neighbouring macro cells 108a-108c; and/or the downlink output power level received from the neighbouring macro cell 108a-108c that is closest to the UE 106a.

The processor 601 is further configured to estimate the interference power based on the further UE(s) 112a-112c. The apparatus 600 may be implemented in the low power node 104 of the low power cell 102 for use in performing uplink power control in relation to the UE 106, 106a-106b being served by the low power node 104.

The base stations, nodes, low power nodes, UEs, network entities, apparatus and computing systems as described herein each may perform the methods and processes as described herein. The processors of such systems are configured to execute computer program instructions based on the methods and processes described herein, such instructions being contained in a computer-readable medium or non-transitory computer readable medium, such as a memory. The computer program instructions may be read into memory from another computer-readable medium or from another device via a communication interface. The instructions contained in memory cause the processor of a base stations, nodes, low power nodes, UEs, network entities, or other such apparatus to perform the processes or methods as described herein. Alternatively or in addition to, hardwired circuitry may be used in place of or in combination with the computer program instructions to implement processes and methods consistent with the present invention. Examples of hardware circuitry may include, but are not limited to, semiconductor chips, integrated circuits, field programmable gate arrays, application-specific integrated circuits, electronically programmable integrated circuits and the like. Thus, the present invention is not limited to any specific combination of hardware circuitry and/or software.

In addition, there may be provided a computer program, comprising computer readable code means which, when run from a computer readable medium in the form of a memory 604 on a processor 601 of an apparatus 600, causes the apparatus to perform the methods or processes as described herein with reference to FIGS. 1-6. There may also be provided a computer program product comprising a computer readable medium 604 and the computer program, wherein the computer program is stored on the computer readable medium 604.

Although the invention has been described in terms of example solutions or preferred embodiments as set forth above, it should be understood that these examples or embodiments are illustrative only and that the claims are not limited to only those examples or embodiments.

Those skilled in the art will be able to make modifications and alternatives in view of the disclosure which are contemplated as falling within the scope of the appended claims. Each of the features, steps, servers or apparatus disclosed or illustrated in the present specification may be incorporated into the invention, whether alone or in any appropriate combination with any other feature, step, or node disclosed or illustrated herein.

The invention claimed is:

1. A method for uplink power control in a communication system comprising a low power cell with a low power node serving a user equipment (UE), and a macro cell with a base station serving one or more other UE(s), wherein the low power cell is a neighbour of the macro cell, the method, performed by the low power node, including:
   determining a power offset between the macro cell and the low power cell;
   calculating a received power spectral density target for the UE based on a determined minimum of a first set of values and a second set of values,
      wherein the first set of values comprises a first signal strength target for the UE and an estimated noise and interference power, and
      wherein the second set of values comprises a second signal strength target for the UE and the calculated power offset; and
   adjusting the uplink power control for the UE based on the received power spectral density target.

2. The method of claim 1, wherein the first signal strength target is based on a signal-to-interference plus noise ratio, SINR, target for the UE.

3. The method of claim 2, further comprising determining the SINR target for the UE based on the noise and interference power to achieve a sufficient throughput performance for the UE while minimizing any impact on throughput performance for the one or more other UE(s) in the macro cell.

4. The method of claim 1, wherein the first and second signal strength targets are initially the same.

5. The method of claim 1, wherein adjusting the uplink power control for the UE further comprises determining an uplink power control adjustment based on the received power spectral density and transmitting the uplink power control adjustment to the UE.

6. The method of claim 1, wherein adjusting the uplink power control for the UE further comprises performing closed loop uplink power control for the UE based on the received power spectral density.

7. The method of claim 1, wherein adjusting the uplink power control for the UE further comprises performing uplink power control based on the uplink scheduling grant on a Physical Downlink Control Channel (PDCCH).

8. The method of claim 1, wherein adjusting the uplink power control for the UE further comprises determining an uplink power control target for the UE based on the received power spectral density target, and transmitting the uplink power control target to the UE for reconfiguring the transmit power of the UE.

9. The method of claim 8, wherein the uplink power control target for the UE is transmitted to the UE using Radio Resource Control (RRC) signaling.

10. The method of claim 1, wherein the estimated noise and interference power comprises estimating an interference power corresponding to one or more of the other UE(s) in the macro cell.

11. The method of claim 1, wherein determining a power offset further comprises calculating the power offset based on the downlink power difference between the macro cell and the low power cell.

12. The method of claim 11, wherein determining the power offset further comprises:
   receiving at the low power node a downlink transmit power level associated with the macro cell from the base station; and
   calculating the downlink transmit power difference based on the received macro cell downlink transmit power and the low power node downlink transmit power.

13. The method of claim 1, wherein determining the power offset further includes calculating the power offset based on a cell offset.

14. The method of claim 1, wherein the low power cell overlaps with the macro cell.

15. The method of claim 1, the communication system further comprising one or more further macro cell(s) with one or more further base station(s), each further base station serving one or more further UE(s), and the lower power cell is a neighbour of each of the further macro cell(s), wherein calculating the power offset further includes taking into account the further macro cell(s).

16. The method of claim 15, wherein calculating the power offset further includes taking into account the downlink power difference between the neighbouring macro cell(s) and the low power cell.

17. The method of claim 16, wherein calculating the power offset further includes calculating the power offset after receiving the downlink output power levels from the neighbouring macro cells.

18. The method of claim 15, further comprising calculating the power offset based on either:
   the average downlink output power levels received from the neighbouring macro cells;
   the maximum downlink output power level received from the neighbouring macro cells;
   the minimum downlink output power level received from the neighbouring macro cells; or
   the downlink output power level received from the neighbouring macro cell that is closest to the UE.

19. The method of claim 15, further comprising estimating the interference power further includes estimating an interference power based on the further UE(s).

20. A method as claimed in claim 1, wherein the received power spectral density target includes an upper limit of the second signal strength target plus the calculated power offset when the estimated noise and interference power reaches a threshold.

21. An apparatus for uplink power control in a communication system, the communication system comprising a low power cell with a low power node serving a user equipment (UE), and a macro cell with a base station serving one or more other UE(s), wherein the low power cell is a neighbour of the macro cell, the apparatus comprising:
   a processor, a receiver, a transmitter, and a memory, the processor connected to the receiver, the transmitter and the memory, wherein:
   the processor is configured to:
      determine a power offset between the macro cell and the low power cell;
      calculate a power spectral density target for the UE based on a determined minimum of a first set of values and a second set of values,
         wherein the first set of values comprises a first signal strength target for the UE, an estimated noise power, and the estimated interference, and
         wherein the second set of values comprises a second signal strength target for the UE and the calculated power offset; and
      adjust the uplink power control for the UE based on the received power spectral density target.

22. The apparatus of claim 21, wherein the apparatus is implemented in the low power node.

23. A non-transitory computer readable medium, comprising computer readable code executed to perform operations comprising:
- determining a power offset between the macro cell and the low power cell;
- calculating a received power spectral density target for the UE based on a determined minimum of a first set of values and a second set of values,
  - wherein the first set of values comprises a first signal strength target for the UE and an estimated noise and interference power, and
  - wherein the second set of values comprises a second signal strength target for the UE and the calculated power offset; and
- adjusting the uplink power control for the UE based on the received power spectral density target.

* * * * *